(12) United States Patent
Sotiropoulou et al.

(10) Patent No.: US 11,111,846 B2
(45) Date of Patent: Sep. 7, 2021

(54) LUBE OIL CONTROLLED IGNITION ENGINE COMBUSTION

(71) Applicant: Prometheus Applied Technologies, LLC, Fort Collins, CO (US)

(72) Inventors: Maria-Emmanuella Sotiropoulou, Fort Collins, CO (US); Luigi P. Tozzi, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 0 days.

(21) Appl. No.: 16/039,266

(22) Filed: Jul. 18, 2018

(65) Prior Publication Data

US 2019/0024578 A1    Jan. 24, 2019

Related U.S. Application Data

(60) Provisional application No. 62/534,096, filed on Jul. 18, 2017.

(51) Int. Cl.
*F02B 43/10*    (2006.01)
*F02D 13/02*    (2006.01)
(Continued)

(52) U.S. Cl.
CPC ............. *F02B 43/10* (2013.01); *F02B 1/12* (2013.01); *F02D 13/0234* (2013.01);
(Continued)

(58) Field of Classification Search
CPC ........ F02B 43/10; F02B 1/12; F02B 2275/14; F02B 2043/103; F02D 13/0234;
(Continued)

(56) References Cited

U.S. PATENT DOCUMENTS

2005/0087169 A1 *  4/2005  Yoshida ............... F02N 19/004
                                                    123/299
2009/0301086 A1 * 12/2009  Ralston ................ F02B 41/06
                                                    60/620
(Continued)

FOREIGN PATENT DOCUMENTS

DE    102013226046 A1 *  6/2014  .......... C10M 133/44
JP    2013245615 A    * 12/2013

*Primary Examiner* — Jacob M Amick
*Assistant Examiner* — Charles J Brauch
(74) *Attorney, Agent, or Firm* — Barcelo, Harrison & Walker LLP

(57) ABSTRACT

In certain embodiments, Lube Oil Controlled Ignition (LOCI) Engine Combustion overcomes the drawbacks of known combustion technologies. First, lubricating oil is already part of any combustion engine; hence, there is no need to carry a secondary fuel and to have to depend on an additional fuel system as in the case of dual-fuel technologies. Second, the ignition and the start of combustion rely on the controlled autoignition of the lubricating oil preventing the occurrence of abnormal combustion as experienced with the Spark Ignition technology. Third, LOCI combustion is characterized by the traveling of a premixed flame; hence, it has a controllable duration resulting in a wide engine load-speed window unlike the Homogeneous Charge Compression Ignition technology where the engine load-speed window is narrow. Adaptive Intake Valve Closure may be used to control in-cylinder compression temperature to be high enough to realize the consistent auto ignition of the lubricating oil mist.

10 Claims, 4 Drawing Sheets

(51) Int. Cl.
*F02D 19/10* (2006.01)
*F02B 1/12* (2006.01)
*F02D 19/02* (2006.01)
*F02M 21/02* (2006.01)

(52) U.S. Cl.
CPC ....... *F02D 13/0269* (2013.01); *F02D 19/022* (2013.01); *F02D 19/024* (2013.01); *F02D 19/10* (2013.01); *F02M 21/0254* (2013.01); *F02M 21/0257* (2013.01); *F02M 21/0275* (2013.01); *F02B 2043/103* (2013.01); *F02B 2275/14* (2013.01)

(58) Field of Classification Search
CPC .... F02D 19/10; F02D 13/0269; F02D 19/024; F02D 19/022; F02M 21/0275; F02M 21/0257; F02M 21/0254
See application file for complete search history.

(56) References Cited

U.S. PATENT DOCUMENTS

| | | | |
|---|---|---|---|
| 2012/0226424 A1* | 9/2012 | Adams | G01L 3/26 701/93 |
| 2014/0283800 A1* | 9/2014 | Hellstrom | F02D 41/0062 123/568.14 |
| 2015/0090222 A1* | 4/2015 | Rebinsky | F02D 41/0027 123/435 |
| 2015/0211464 A1* | 7/2015 | Ishida | F02M 67/14 239/5 |
| 2016/0281615 A1* | 9/2016 | Flynn | F02D 41/0002 |

* cited by examiner

LUBE OIL CONTROLLED IGNITION ENGINE COMBUSTION

I. CROSS-REFERENCE TO RELATED APPLICATIONS

This application claims priority of U.S. Patent Application No. 62/534,096, entitled "Lube Oil Controlled Ignition Engine Combustion," and filed Jul. 18, 2017. The entirety of the foregoing patent application is incorporated by reference herein to the extent consistent with the present disclosure.

II. FIELD OF THE INVENTION

The disclosure generally relates to systems and methods for lube oil controlled ignition engine combustion, and more particularly to a method and apparatus for controlling the ignition and the start of combustion in an engine with lube oil, thereby, preventing the occurrence of abnormal combustion typical of high power density engines using spark ignition or dual-fuel ignition technology.

III. BACKGROUND OF THE INVENTION

The following references describe problems with autoignition and are incorporated by reference herein to the extent consistent with this disclosure:
1. Walker R. N., et al: Comparison of Diesel Pilot Ignition (DPI) and Reactivity Controlled Compression Ignition (RCCI) in a Heavy-Duty Engine. Proceedings of the ASME, 2015 Internal Combustion Engine Division Fall Technical Conference ICEF2015, November 8-11, 2015, Houston, Tex., USA ICEF2015-1128.
2. Yasueda S., et al.: The abnormal combustion affected by lubricating oil ignition in premixed gas engine. Proceedings of the ASME Internal Combustion Engine Division Spring Technical Conference, 2012, ICES2012-81042.
3. Yasueda S., et al.: Predicting Autoignition caused by Lubricating Oil in Gas Engines. CIMAC Congress 2013, Shanghai, Paper No. 37.
4. Zhu S., et al.: A Method for Developing Countermeasures for Lubricating Oil Preignition in Natural Gas Engines. Proceedings of the 9th Dessau Gas Engine Conference, 2015.
5. Dahnz C., et al.: Irregular combustion in supercharged spark ignition engines—pre-ignition and other phenomena. International Journal of Engine Research 2010, 11:485, DOI 10.1243/14680874JER609.
6. Tozzi L., et al.: Lean-Burn Pre-Combustion Chamber. U.S. Patent Application 62/292301, filed Feb. 6, 2017 in USA, Japan, Europe and Canada.
7. Singh, S., et al.: "Development of a flame propagation model for dual-fuel partially premixed compression ignition engines". Internal Journal of Engine Research, 7(1), pp. 75-75.
8. Hiltner, J., et al.: "Homogeneous charge compression ignition with natural gas: Fuel composition implications". SAE Technical Paper 2002-01-0417.
9. Tinschmann G., et al.: Large Gas Engines—75 mg/Nm3 @ 15% O2 NOx—Engine-Internal Measures or Exhaust Aftertreatment? CIMAC Congress 2013, Shanghai, Paper No. 296.
10. Liu, J., et al.: "Effect of pilot fuel quantity on the emission characteristics of a CNG/Diesel dual fuel engine with optimized pilot injection timing", Applied Energy, 110, pp. 201-206.

A high-power density internal combustion engine, like a modern natural gas engine, using a spark plug or a micro-pilot oil injector to initiate combustion, can experience abnormal combustion due to uncontrolled engine lubricating oil autoignition preventing achieving high levels of power density as described in further detail in references 2, 3 and 5 above.

Known technologies used to initiate combustion in a pre-mixed combustion engine include the following:
Spark Ignition (SI) as described in reference (9) above;
Micro-Pilot Ignition (MPI) as described in reference (10) above;
Homogeneous Charge Compression Ignition (HCCI) as described in reference (8) above;
Reactivity Controlled Compression Ignition (RCCI) as described in reference (1) above; and
Partially Premixed Compression Ignition (PPCI) as described in reference (7) above.

Of the technologies listed above, the SI, MPI, RCCI and PPCI are notoriously susceptible to lube oil autoignition causing abnormal combustion as discussed in references 2, 3, 4, 5 and 6 above. In addition, MPI, RCCI and PPCI (dual-fuel technologies) necessitate the injection of a secondary fuel in the combustion chamber, which adds significant cost and complexity making these technologies less desirable. On the other hand, the operation with HCCI is confined to a narrow engine load-speed window which makes it not generally practical.

There is a need to address the foregoing deficiencies in the art.

IV. BRIEF DESCRIPTION OF THE DRAWINGS

V. DETAILED DESCRIPTION

In contrast, Lube Oil Controlled Ignition (LOCI) Engine Combustion overcomes the drawbacks of the known technologies described in the background of the invention section above for at least the following advantages of certain embodiments. First, lubricating oil is already part of any combustion engine; hence, there is no need to carry a secondary fuel and to have to depend on an additional fuel system as in the case of all the dual-fuel technologies above. Second, the ignition and the start of combustion rely on the controlled autoignition of the lubricating oil preventing the occurrence of abnormal combustion as experience with the SI technology. Third, LOCI combustion is characterized by the traveling of a premixed flame; hence, it has a controllable duration resulting in a wide engine load-speed window unlike the HCCI technology where the engine load-speed window is narrow.

Figure 1:
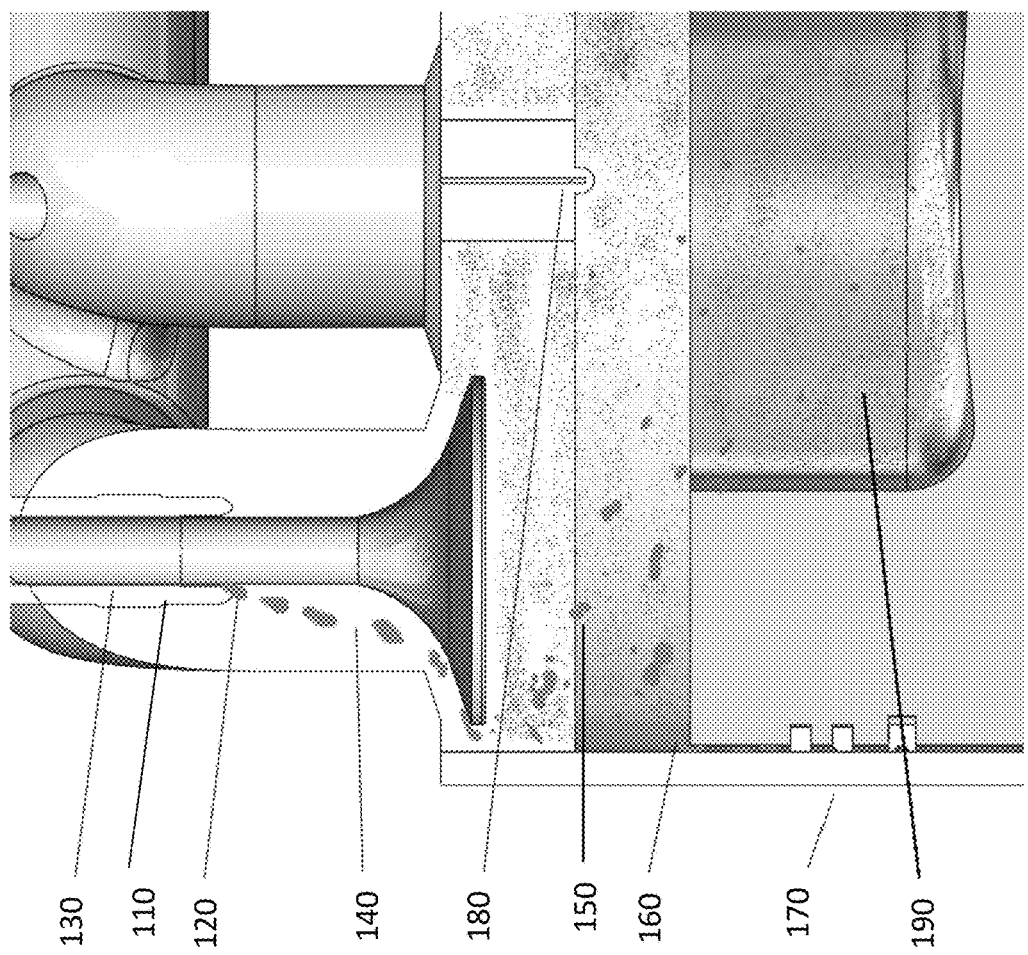
FIG. 1 depicts an engine combustion chamber in accordance with certain embodiments.

An embodiment having a small amount of engine lubricating oil directly injected into the combustion chamber as shown in FIG. 1 and described in greater detail below achieves consistent ignition and efficient start of combustion with the advantage of eliminating the need of a secondary fuel chemistry and the benefit of using the chemical reactivity of the lubricating oil which necessitates only a fraction of the amount of the secondary fuel used in known duel-fuel methods (RCCI, PPCI and MPI).

In certain embodiments, an internal combustion engine is disclosed comprising: a combustion chamber comprising: a cylinder comprising a liner and a cylinder head; a piston top movably disposed within the cylinder to form a combustion volume; a pre-mixed air-fuel mixture in the combustion volume; and a mist of lubricating oil present in the combustion volume; wherein the pre-mixed air-fuel mixture is burnt as a result of auto-ignition of the mist of lubricating oil present in the combustion volume; wherein a flow velocity approaching the cylinder head and liner is between 10 and 20 m/s; wherein a lambda value approaching the cylinder head and liner is lower than 1.9; and wherein the air-fuel mixture has a temperature greater than 800 K approaching the cylinder head and liner. The piston top may comprise a crown comprising: a central squish portion substantially orthogonal to a longitudinal axis of the cylinder; and a sloped outer portion disposed radially outward of the central squish portion; wherein the movement of the piston head generates a flow vortex velocity approaching the cylinder head and liner of between 10 and 20 m/s. The internal combustion engine may further comprise: one or more intake ports substantially parallel to the longitudinal axis of the cylinder to generate a lambda value approaching the cylinder head and liner that is lower than 1.9. The internal combustion engine may have a predetermined engine compression ratio and intake valve timing to generate an air-fuel mixture temperature greater than 800 K approaching the cylinder head and liner. The air-fuel mixture temperature may be determined based on one or more of a lubrication oil autoignition temperature, a fuel methane number, an engine oil consumption rate, an engine load and an engine compression ratio. A small amount of lubricating oil may be directly injected into the combustion volume to achieve consistent autoignition and efficient start of combustion. The amount of lubricating oil directly injected into the combustion volume may be less than 5% of an amount of secondary fuel directly injected into an engine combustion chamber by state of the art of dual-fuel engine ignition systems.

In certain embodiments, an internal combustion engine is disclosed comprising an adaptive intake valve closing timing control system wherein an intake valve closing timing is selected based on one or more of a lubrication oil autoignition temperature, a fuel methane number, an engine oil consumption rate, an engine load, an engine compression ratio and an engine air-fuel mixture. The intake valve closing timing may be adjusted based on the engine load. The intake valve closing timing may be advanced when the engine load is higher than about 50% and may be retarded when the engine load is lower than about 50%. The intake valve closing timing may be advanced when the lubrication oil autoignition temperature is lower than about 700 K and may be retarded when the lubrication oil autoignition temperature is higher than about 700 K. The intake valve closing timing may be advanced when the fuel methane number is lower than about 70 and may be retarded when the fuel methane number temperature is higher than about 70. The intake valve closing timing may be advanced when the engine oil consumption rate is higher than about 0.2 g/kW-hr and may be retarded when the engine oil consumption rate is lower than about 0.2 g/kW-hr. The intake valve closing timing may be advanced when the engine compression ratio is higher than about 13 and may be retarded when the engine compression ratio is lower than about 13. The intake valve closing timing may be advanced when an engine air-fuel mixture is lower than about 1.8 Lambda and may be retarded when the engine air-fuel mixture is higher than about 1.8 Lambda.

In certain embodiments, an internal combustion engine is disclosed comprising an engine combustion chamber; an adaptive intake valve closing timing control system comprising; an engine controller; an intake valve; and an intake valve actuator coupled to the engine controller; wherein the engine controller is configured to receive input parameter values of a lubrication oil autoignition temperature, a fuel methane number, an engine oil consumption rate, an engine load, an engine compression ratio and an engine air-fuel mixture and to provide a feedback signal to the intake valve actuator to control the opening and closing of the intake valve to control the air-fuel mixture compression temperature to cause consistent autoignition of the lubrication oil mist present in the engine combustion chamber. Consistent autoignition of the lubrication oil mist present in the engine combustion chamber may occur at a selected timing with respect to the piston position to maximize engine efficiency and minimize exhaust emissions. The intake valve actuator may be an electromechanical valve actuator controlled by the engine controller. The intake valve actuator may be controlled based on one or more of a lubrication oil autoignition temperature, a fuel methane number, an engine oil consumption rate, an engine load, an engine compression ratio and an engine air-fuel mixture.

A high-power density internal combustion engine, like a modern natural gas engine, using a spark plug or a micro-pilot oil injector to initiate combustion, can experience abnormal combustion due to uncontrolled engine lubricating oil autoignition preventing achieving high levels of power density.

In certain embodiments, FIG. 1 shows mechanisms by which the engine lubricating oil may enter an engine combustion chamber where it may be broken up by the flow dynamic forces into a fine mist. As shown in FIG. 1, lube oil 120 may escape between valve guide 110 and intake valve 130 into intake port 140 and from there into combustion chamber 150. Alternately or in addition, lube oil 160 may escape from ring pack 170 into combustion chamber 150. Alternately or in addition, lube oil may be injected directly into the combustion chamber via a micro-pilot oil injector (or spark plug) 180. Lube oil from any of the foregoing sources may form lube oil mist 190.

In certain embodiments, a method and apparatus are disclosed for controlling the ignition and the start of combustion in an engine with lube oil, thereby, preventing the occurrence of abnormal combustion typical of high power density engines using spark ignition or dual-fuel ignition technology (e.g., micro-pilot ignition).

In certain embodiments, the lubricating oil mist already present inside the combustion chamber of an engine may be used as the ignition source promoting reliable and efficient combustion of the fuel air mixture present in the engine cylinder.

Figure 2:
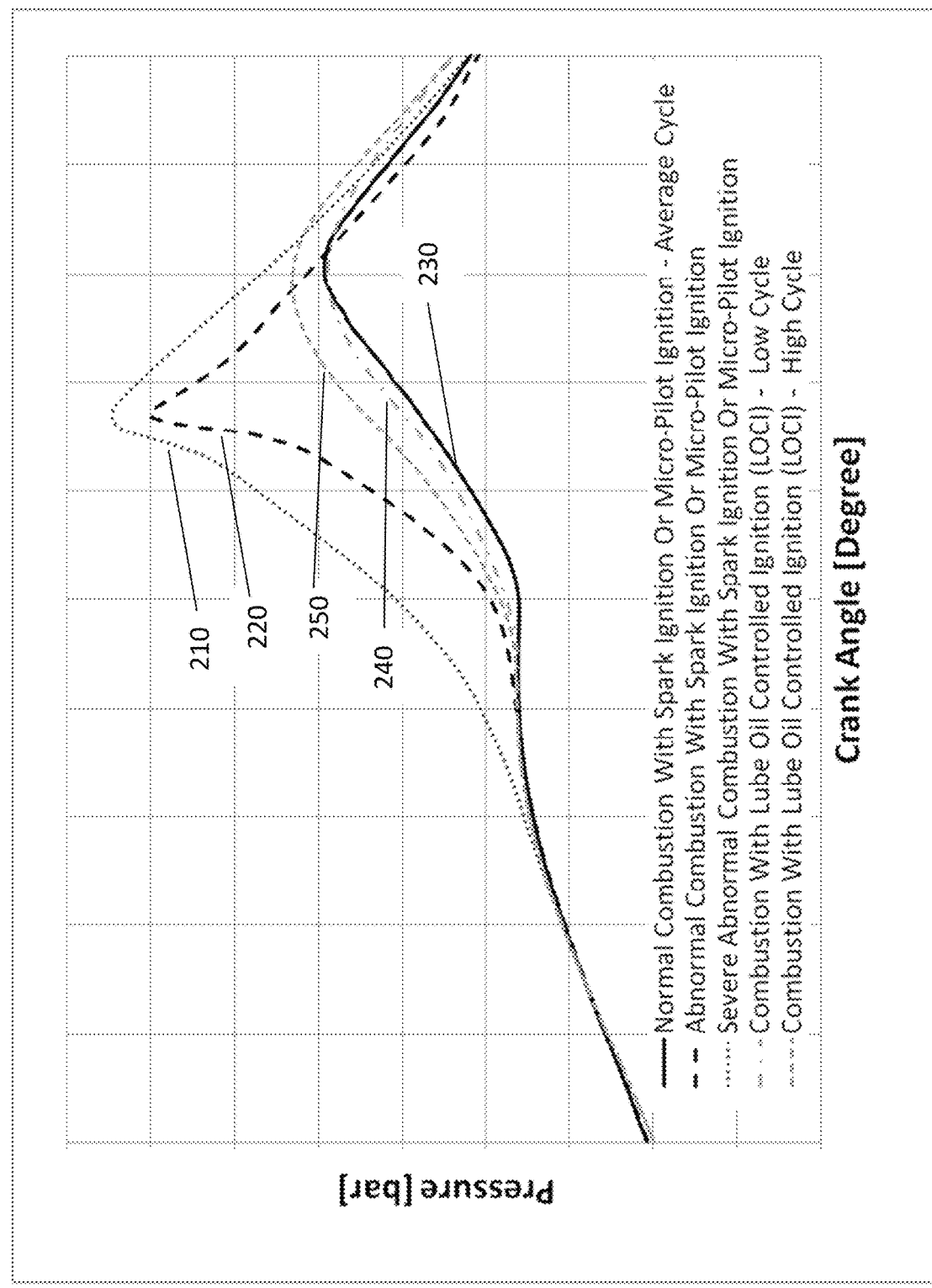
FIG. 2 depicts multiple combustion pressure traces including low cycle and high cycle traces for combustion with lube oil controlled ignition in accordance with certain embodiments.

FIG. 2 depicts various combustion pressure traces relative to various cases. As shown, in the cases of abnormal 220 and severe abnormal 210 combustions with spark ignition or micro-pilot ignition, the cylinder combustion peak pressure can be significantly higher than the normal average combustion pressure 230, which may be the cause of engine failure. In contrast, in the cases of combustions with lube oil controlled ignition, there are no abnormal combustion cycles and the range of variability between the absolute low cycle 240 and the absolute high cycle 250 is very narrow indicating excellent combustion stability.

In certain embodiments, engine in-cylinder air-fuel mixture temperature, Lambda and flow velocity may be used to precisely control the autoignition of the lube oil mist present in the engine combustion chamber.

Figure 3:
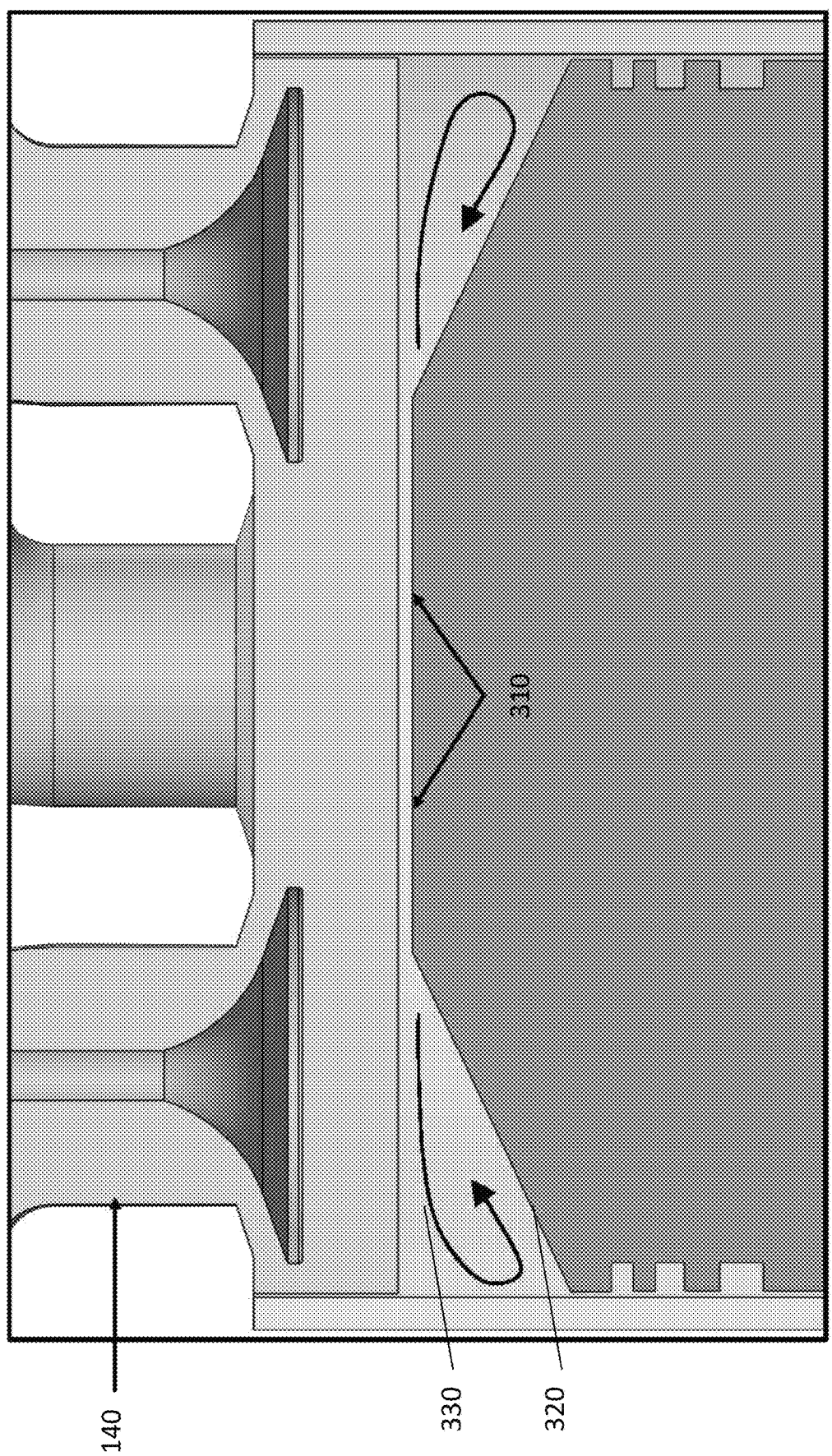
FIG. 3 depicts an engine combustion chamber with straight or non-swirl intake ports in accordance with certain embodiments.

In certain embodiments as shown in FIG. 3 may include a piston top that includes a crown with central squish portion 310 that may be substantially orthogonal to a longitudinal axis of the cylinder; and a sloped outer portion 320 disposed radially outward of the central squish portion that could be used to achieve the desired flow velocity vortex 330. Also shown in FIG. 3 is an example of straight or non-swirl intake ports 140 that may be used to achieve the desired lambda.

In certain embodiments, Engine Intake Valve Closure (IVC) timing may be used to control the engine cylinder air-fuel mixture compression temperature and may be selected in relation to the following primary parameters:
 a. Lube oil autoignition temperature
 b. Fuel Methane Number (MN)
 c. Engine oil consumption rate
 d. Engine load
 e. Engine speed
 f. Engine geometric compression ratio (CR)
 g. Air-fuel mixture ratio (AFR)

In certain embodiments, Adaptive Intake Valve Closure (IVC) may be used to control in-cylinder compression temperature to be high enough to realize the consistent auto ignition of the lubricating oil mist at the time when the piston position is more favorable for creating an efficient combustion event.

In certain embodiments, the following relationships between the IVC timing and certain engine parameters may be used to maintain a stable start of combustion (SOC):

The following parameters require early IVC to realize consistent auto ignition of lubricating oil mist:
 i. Lube oil having lower autoignition temperature than about 700 K
 ii. Low MN Fuel having lower MN than about 70
 iii. Engine having higher oil consumption rate than about 0.2 g/kW-h
 iv. Higher engine load conditions than about 50% load
 v. Engine having higher CR than about 13
 vi. Air-fuel mixture having a lower AFR than about 1.8 Lambda The following parameters require late IVC to realize consistent auto ignition of lubricating oil mist:
 vii. Lube oil having higher autoignition temperature than about 700 K
 viii. Low MN Fuel having higher MN than about 70
 ix. Engine having lower oil consumption rate than about 0.2 g/kW-h
 x. Lower engine load condition than about 50% load
 xi. Engine having lower CR than about 13
 xii. Air-fuel mixture having a higher AFR than about 1.8 lambda Adaptive IVC timing may be used where the basic IVC timing is set in relation to:
 a. Lube oil autoignition temperature
 b. Fuel MN
 c. Engine oil consumption rate
 d. Engine load
 e. Engine CR
 f. Engine AFR In certain embodiments, Adaptive IVC timing may be used where the basic IVC timing is adjusted in relation to the lube oil autoignition temperature such that early IVC may be used for lower lube oil autoignition temperature than about 700 K and late IVC may be used for higher lube oil autoignition temperature than about 700 K.

In certain embodiments, Adaptive IVC timing may be used where the basic IVC timing is adjusted in relation to the fuel MN such that early IVC may be used for lower fuel MN than about 70 and late IVC may be used for higher fuel MN than about 70.

In certain embodiments, Adaptive IVC timing may be used where the basic IVC timing is adjusted in relation to the engine oil consumption rate such that late IVC may be used for lower engine oil consumption than about 0.2 g/kW-h and early IVC may be used for higher engine oil consumption than about 0.2 g/kW-h.

In certain embodiments, Adaptive IVC timing may be used where the basic IVC timing is adjusted in relation to the engine load such that late IVC may be used for lower engine load than about 50% load and early IVC may be used for higher engine load than about 50% load.

In certain embodiments, Adaptive IVC timing may be used where the basic IVC timing is adjusted in relation to the engine CR such that late IVC may be used for lower engine CR than about 13 and early IVC may be used for higher engine CR than about 13.

In certain embodiments, Adaptive IVC timing may be used where the basic IVC timing is adjusted in relation to the engine AFR such that early IVC may be used for lower engine AFR than about 1.8 Lambda and late IVC may be used for higher engine AFR than about 1.8 Lambda.

Figure 4:
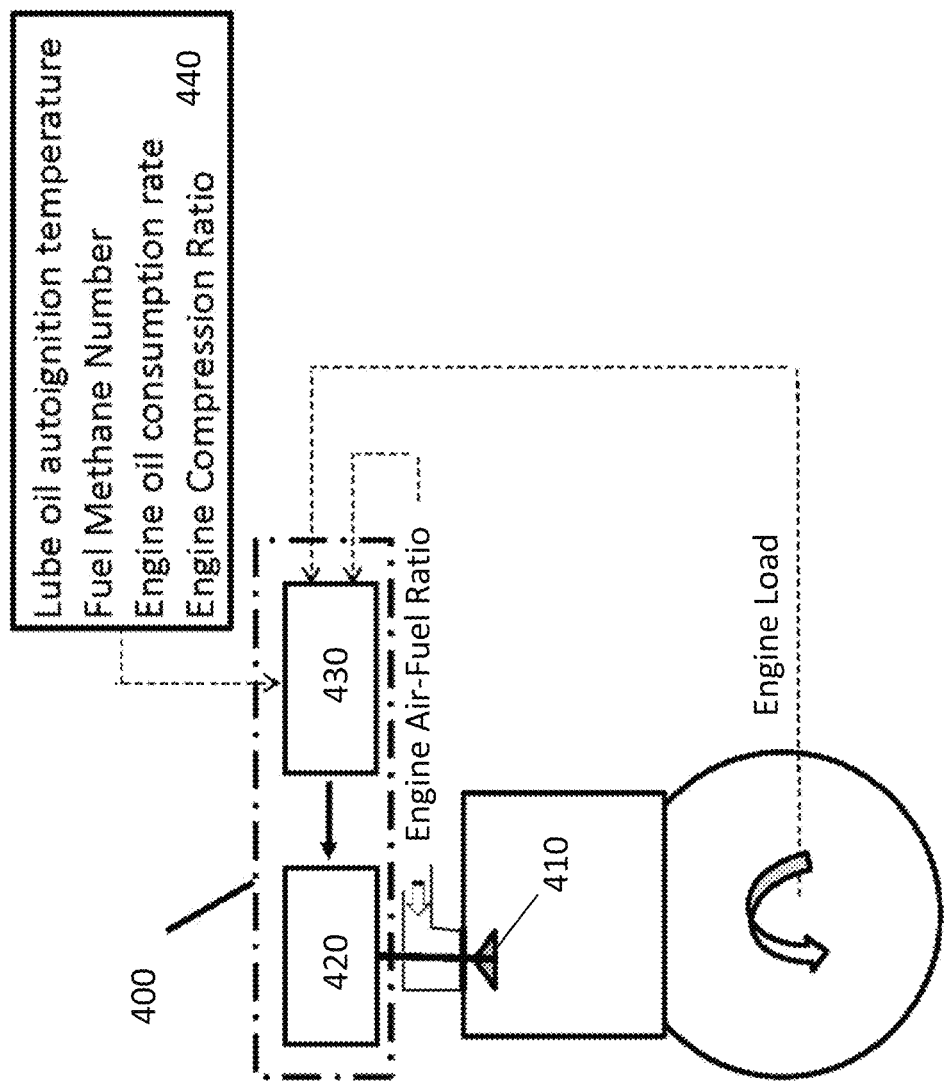
FIG. 4 depicts an adaptive intake valve control timing system in accordance with certain embodiments.

In certain embodiments, FIG. 4 depicts an adaptive IVC timing control 400 where intake valve 410 may be actuated by electro-mechanical actuator 420 controlled by engine controller 430.

The timing may be based on (1) the feedback signals 440 for the fuel MN, engine oil consumption rate, engine AFR and engine load and/or (2) selected values for the specific lube oil autoignition temperature and engine compression ratio.

In an embodiment not requiring the adaptive IVC timing control system, the method and system may include injection of a small amount of the engine lubricating oil directly into the combustion chamber by means of the micro-pilot oil injector 180 as shown in FIG. 1, thereby providing a selected amount of lubricating oil to auto-ignite and achieve efficient and consistent start of combustion.

In certain embodiments, flow velocity in the range of 10-20 m/s approaching the cylinder head and liner may be used to achieve consistent lube oil droplets mist. In certain embodiments, a Lambda value lower than 1.9 approaching the cylinder head and liner may be used to achieve consistent flame propagation. In certain embodiments, an in-cylinder air-fuel mixture temperature greater than 800 K approaching the cylinder head and liner may be used to achieve consistent autoignition of the lube oil. Certain embodiments may include an adaptive IVC timing control system while other embodiments may rely on the injection of a small quantity of engine lubricating oil directly into the combustion chamber.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. An internal combustion engine comprising an adaptive intake valve closing timing control system wherein an intake valve closing timing is selected based on one or more of a lubrication oil autoignition temperature, a fuel methane number, an engine oil consumption rate, an engine compression ratio and an engine air-fuel mixture to cause consistent autoignition of a lubrication oil mist present in the engine combustion chamber.

2. The internal combustion engine of claim 1 wherein the intake valve closing timing is advanced when the lubrication oil autoignition temperature is lower than about 700 K and is retarded when the lubrication oil autoignition temperature is higher than about 700 K.

3. The internal combustion engine of claim 1 wherein the intake valve closing timing is advanced when the fuel methane number is lower than about 70 and is retarded when the fuel methane number temperature is higher than about 70.

4. The internal combustion engine of claim 1 wherein the intake valve closing timing is advanced when the engine oil consumption rate is higher than about 0.2 g/kW-h and is retarded when the engine oil consumption rate is lower than about 0.2 g/kW-h.

5. The internal combustion engine of claim 1 wherein the intake valve closing timing is advanced when the engine compression ratio is higher than about 13 and is retarded when the engine compression ratio is lower than about 13.

6. The internal combustion engine of claim 1 wherein the intake valve closing timing is advanced when an engine air-fuel mixture is lower than about 1.8 Lambda and is retarded when the engine air-fuel mixture is higher than about 1.8 Lambda.

7. An internal combustion engine comprising
an engine combustion chamber;
an adaptive intake valve closing timing control system comprising;
an engine controller;
an intake valve; and
an intake valve actuator coupled to the engine controller;
wherein the engine controller is configured to receive input parameter values of one or more of a lubrication oil autoignition temperature, a fuel methane number, an engine oil consumption rate, an engine compression ratio and an engine air-fuel mixture and to provide a feedback signal to the intake valve actuator to control the opening and closing of the intake valve to control an air-fuel mixture compression temperature to cause consistent autoignition of a lubrication oil mist present in the engine combustion chamber.

8. The internal combustion engine of claim 7 wherein consistent autoignition of the lubrication oil mist present in the engine combustion chamber occurs at a selected timing with respect to a piston position to maximize engine efficiency and minimize exhaust emissions.

9. The internal combustion engine of claim 7 wherein the intake valve actuator is an electromechanical valve actuator controlled by the engine controller.

10. The internal combustion engine of claim 7 wherein the intake valve actuator is controlled based on one or more of a lubrication oil autoignition temperature, a fuel methane number, an engine oil consumption rate, an engine load, an engine compression ratio and an engine air-fuel mixture.

* * * * *